March 24, 1953 C. MacSPORRAN 2,632,430
SAFETY FUEL SHUTOFF SYSTEM
Filed Nov. 26, 1951 2 SHEETS—SHEET 1

INVENTOR.
C. MAC SPORRAN
BY Hudson & Young
ATTORNEYS

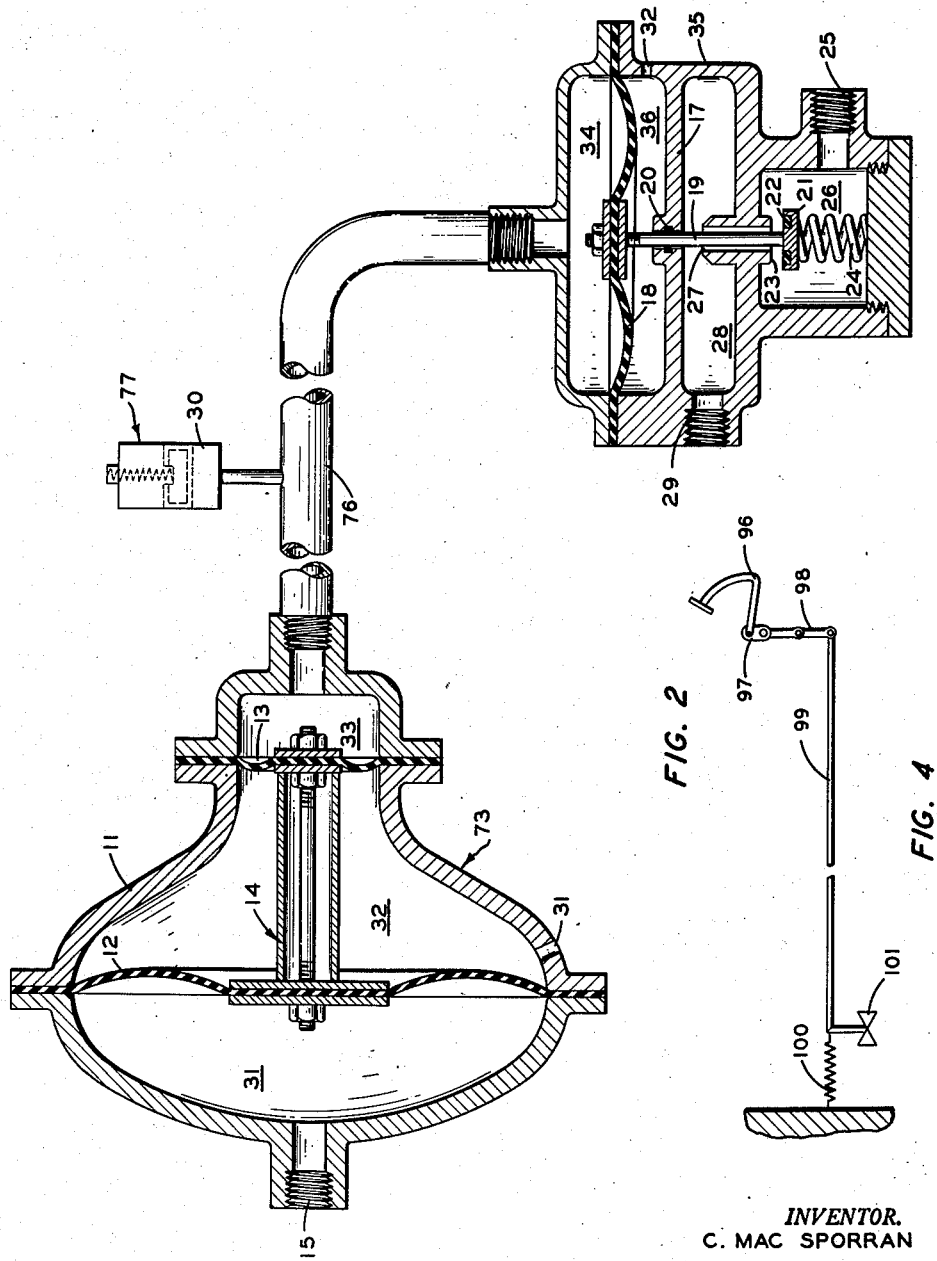

Patented Mar. 24, 1953

2,632,430

UNITED STATES PATENT OFFICE 2,632,430

SAFETY FUEL SHUTOFF SYSTEM

Charles MacSporran, Bartlesville, Okla., assignor to Phillips Petroleum Company, a corporation of Delaware Application November 26, 1951, Serial No. 258,267

6 Claims. (Cl. 123—120)

1

This invention relates to motor vehicle operation. In one aspect it relates to a fuel system for motor vehicles and the operation thereof. In another aspect it relates to a propane fuel system and its application as fuel to motor vehicles.

An object of this invention is to devise a fuel system for utilizing relatively inexpensive propane as fuel for automotive vehicles.

Another object of this invention is to devise safety features for opening and closing the source of such fuel to an automotive carburetor.

Another object of this invention is to devise apparatus for starting internal combustion motors using liquid propane as fuel.

Still other objects and advantages of my invention will be realized upon reading the following disclosure which taken with the attached drawing forms a part of this specification.

Figure 3:
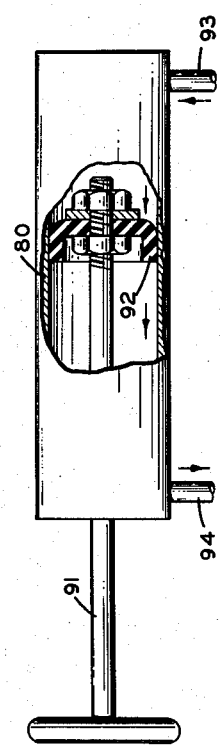
Figure 1:
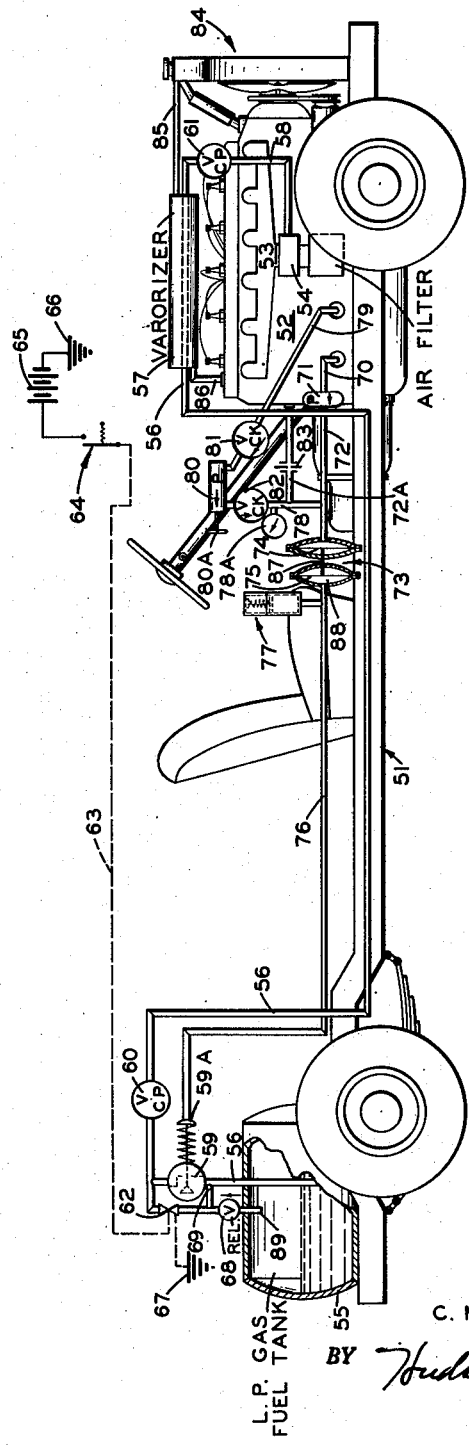

In the drawing, Figure 1 is a diagrammatic representation of the apparatus of my invention applied to a motor vehicle. Figure 2 is a diagrammatic view, partly in section, of a portion of the apparatus of Figure 1. Figure 3 is a diagrammatic view, partly in section, of another portion of the apparatus of Figure 1. Figure 4 illustrates another embodiment of my invention.

Easily volatile liquid fuels are widely used for the operation of automotive engines in certain applications. Less volatile fuels than conventional gasolines, such as kerosenes and heavier oils, are also used for propelling automotive vehicles. These less volatile and higher boiling fuels require some form of high temperature vaporizing since the fuel in the cylinder must be in a vaporous condition for combustion. In recent years increasingly large volumes of liquefied petroleum gases have become available. Hydrocarbons coming in this category are mainly propane and butane. These hydrocarbons are ordinarily used at temperatures above their boiling points and under such conditions exert greater than atmospheric pressures. Hence positive shut-off means are necessary to prevent leakage of the fuel from the fuel tank when the automotive engine is not in operation.

Propane boils at about —47° F. and consequently at all reasonable operating temperatures this hydrocarbon is normally in the vapor state. Pressure is required to maintain propane in the liquid state at temperatures above its normal boiling point and accordingly propane must be stored under pressure under any and all conditions prior to its use as a gas. When it is desired to use propane, it is passed through pressure reducers and vaporized with or without provisions for heat exchange. In my apparatus as herein disclosed I make provision for the dispensing of liquid propane to a vaporizer in which the liquid is vaporized prior to its mixing with air in an automotive carburetor. In my apparatus, when the motor is operating and its oil pump functioning, I utilize this oil pressure to operate the liquid propane dispensing system. And further, I provide for the by-passing of propane fuel around the valve to the carburetor for starting-up purposes. My apparatus has the advantage of definitely and absolutely closing off any flow of propane at all times when the engine is not operating. Many other advantages will be realized upon reading the following description.

Referring now to the drawing and specifically to Figure 1, reference numeral 51 identifies a motor vehicle stripped of its body. Reference numeral 52 identifies the engine having an intake manifold 53, a carburetor 54, and a cooling system 84. This cooling system includes in addition to conventional parts, a heat exchanger or vaporizer 57 to which are connected conduits 85 and 86, as shown. A pressure type fuel tank 55 is shown mounted at the rear of the chassis. A conduit 56 leads from the bottom and liquid containing portion of the tank 55 to the vaporizer or heat exchanger 57. This conduit 56 is provided with a hydraulically operable motor valve 59 at a point near the tank 55. This conduit 56 is also provided with a constant pressure outlet valve 60 as shown. The constant pressure valve 60 is situated at a point near the tank 55, while another constant pressure outlet valve 61 is situated between the vaporizer 57 and the carburetor 54 in the conduit 58. A second conduit 89 leads from the vapor space in the top portion of tank 55 to the conduit 56 at a point between the motor valve 59 and the constant pressure outlet valve 60. This conduit 89 is provided with a relief valve 68 at a point adjacent the tank. A short conduit 69 connects conduit 56 at a point between the motor valve 59 and the tank with conduit 89 at a point just downstream from the relief valve 68. Still further downstream of this point of connection is a valve 62. This valve may be a normally closed solenoid valve operable from a push button assembly 64 mounted for example on the instrument panel of the vehicle. This push button assembly is illustrated, diagrammatically, in Figure 1 as comprising a source of electric current 65 grounded at 66, the push button, an electrical conduit 63 connecting this push button assembly with the solenoid valve 62. A second connection from the solenoid valve 62 is grounded at 67 to complete the circuit when the push button is closed.

Attached to the oil-containing section of the oil reservoir of the motor is a conduit 70 leading to an oil pump 71. This pump 71 may be the oil pressure pump built into the motor for circulating lubricating oil under pressure for motor lubrication. Alternately, this pump 71 may be a special pump added for the purpose at hand. In any event, attached to the discharge side of pump 71 is a conduit 72 leading to a chamber containing a diaphragm 74 of the diaphragm assembly 73. This diaphragm 74 has a relatively large surface area. A conduit 72A may be termed a return conduit for carrying oil from the conduit 72 back to the oil reservoir of the motor. This conduit 72A is provided with an orifice plate 83 which contains a hole or orifice of sufficiently small diameter that when the oil pump 71 is in operation an appreciable pressure is maintained between the oil pump 71 and the orifice. A second conduit 79 is attached to the oil containing reservoir of the motor and leads to a manually operable positive displacement pump 80. This pump discharges into a conduit 78 which contains a check valve 82. Conduit 79 also contains a check valve 81. The conduit 78 is provided with an oil pressure gauge 78A. This pressure gauge however, may be installed at any point in conduit 72, 78, or in line 72A upstream of the orifice member 83. Orifice 83 may, preferably, be a pressure relief valve.

A second diaphragm 75 is rigidly attached to the diaphragm 74 by a connecting means 87, as shown. One side of housing 88 containing the second and smaller diaphragm 75 is connected by a conduit 76 to the motor of the motor valve 59. A spring loaded hydraulic fluid reservoir 77 is attached to conduit 76 as shown.

Figure 2 illustrates the pressure booster system of my invention. In this pressure booster system which is actually a hydraulic fluid diaphragm system, a housing 11 encloses two diaphragms 12 and 13. Diaphragm 12 has a considerably larger surface area than diaphragm 13. An opening 15 is threaded to receive a conduit for passage of oil into the reservoir 31. Reservoir 32 is intended to be empty of liquid, a vent 31 being provided for drainage in case any liquid inadvertently enters this space. A connecting assembly 14 is attached at one end to the diaphragm 12 and at the other end to diaphragm 13 to hold the diaphragms in fixed relation to each other. In operation it is intended that when diaphragm 12 moves in either direction the diaphragm 13 follows. A space 33 is provided on the side of diaphragm 13 opposite space 32. A conduit 76 is attached to the housing 11 to provide passage from space 33 to another portion of the apparatus. A motor valve housing 35 is attached at the other end of the conduit 76 as shown to provide communication from space 34 by way of conduit 76 to space 33. This housing 35 contains a diaphragm 18 to which is attached a valve stem 19. This valve stem terminates in a valve head 21 which is provided with a resilient sealing member 22. Housing 35 is so constructed as to provide a valve seat 23 against which the resilient sealing member 22 may seat. A compression spring 24 urges this valve against the seat 23 in opposition to certain movements of the diaphragm 18. A space 36 on the underside of the diaphragm 18 is vented at 32. A threaded opening 25 is provided in the lower portion of housing 35 for inlet of fluid to be dispensed according to my invention. A small chamber 26 is provided in which the spring 24 and the valve head 21 are positioned. When the valve 21 is opened the fluid in the chamber 26 is intended to flow through an annular space 27 surrounding the valve stem 19 and enter a space 28 from which it flows through a threaded opening 29. Surrounding the valve stem 19 is an O-ring seal to seal the valve stem in plate 17 to prevent leakage from the high pressure space 26 to the low pressure space 36. A spring loaded oil reservoir 39 is provided for inlet and outlet of a hydraulic liquid to tube 76 to maintain substantially a constant pressure therein, after the pressure in conduit 76 has been increased sufficiently to open valve 21.

In Figure 3 is illustrated diagrammatically a form of manually operable pump which is adaptable for use in one embodiment of my invention. This pump consists of a cylindrical housing 80 in which there is provided a plunger 92 fitted on the end of a pump rod 91. A tube connection 93 is provided for inlet of liquid to be pumped while connection 94 is provided for outlet thereof.

In the operation of this apparatus of my invention I will explain the operation of the apparatus when using this manually operable pump for supplying pressure to diaphragm 74, for opening valve 59, for the purpose of starting the engine. Referring now to the apparatus of Figure 1, reference numeral 80 refers to such a pump as illustrated in Figure 3. This pump 80 takes suction by way of the conduit 79 on oil from the oil reservoir of the engine and upon operation of the hand pump oil is drawn through the line 79, through the check valve 81 and into the pump 80 upon movement of the handle 80A from right to left. When the handle 80A has reached the end of its stroke toward the left, upon moving the handle toward the right the check valve 81 prevents flow of oil through conduit 79 back into the oil reservoir and upon forcing the pump handle 80A toward the right, any air originally in the pump and in conduit 79 passes the plunger so that ultimately all of the air will be displaced from the pump and connecting conduits. When the conduit 79, the check valve 81, the pump 80, the check valve 82, the conduit 78, the conduit 72A and the orifice member 83 are all filled with oil, further pumping of the pump 80 creates oil pressure in the pressure gauge 78A. The space 88 to the left of the diaphragm 75 of Figure 1, the conduit 76 and the motor 59A of the valve 59 are of course previously filled with a hydraulic liquid via reservoir 77. Upon increasing of the pressure as observed on the pressure gauge 78A the diaphragm 74 is forced from the right to left and accordingly diaphragm 75 moves from right to left since these diaphragms are rigidly attached to each other by element 87. As the diaphragm 75 moves toward the left the oil in space 88 tends to be forced through the conduit 76 into the motor 59A of the motor valve 59 and under these conditions this motor 59A operates to open the valve 59. When this valve 59 opens liquid propane from the reservoir 55 flows through conduit 56, the constant pressure valve 60 and into the vaporizer 57. In this vaporizer liquid propane is vaporized so that only vapor will flow through the constant pressure valve 61 and through conduit 58 into the carburetor 54. Under these conditions fuel reaches the carburetor and the engine may be started. When the engine starts, the oil pump 71 operates to pump oil from the oil reservoir of the engine through line 70, pump 71, conduit 72, conduit 78 and through the orifice 83 in conduit 72A back into the engine reservoir. As mentioned above, on account of the small opening in the orifice plate 83 in which the flow of oil is retarded, a pressure is built up on the upstream of this orifice. This pressure may also be observed on the pressure gauge 78A. This pressure will also be transmitted into the space in the diaphragm assembly 73 corresponding to space 31 of Figure 2. When sufficient pressure is exerted on the diaphragm 74 this diaphragm will be moved from right to left and accordingly will force the diaphragm 75 toward the left to impose a pressure on the hydraulic liquid in the space in this diaphragm assembly corresponding to space 33 of Figure 2. When pressure in this space increases, the hydraulic liquid exerts its pressure in the motor 59A of the motor valve 59 either to open or if opened to maintain in an opened condition this valve to the flow of propane.

Whenever it is desired to stop the motor it is merely necessary to turn off the ignition switch under which condition the motor stops and in conjunction with stopping of the motor, the pump 71 stops and the pressure built up on the upstream side of the orifice plate 83 leaks through this orifice plate in the direction of the oil reservoir resulting in the decrease of the pressure in the space 31 (Fig. 2) of the diaphragm assembly. Under this condition the diaphragm 75 moves from left to right with the result that the motor 59A operates to close the valve 59 to the flow of propane. Thus, immediately upon stopping of the engine propane fuel is closed off.

I have illustrated in Figure 1 another embodiment for use in starting up of the engine. This starting up apparatus includes the push button apparatus 64 and the normally closed solenoid valve 62. When using this apparatus for starting purposes it is merely necessary to push the push botton 64 to close the circuit to the solenoid valve, the valve opens and propane flows through the conduit 56, the conduit 69, the solenoid valve 62 and thence through the constant pressure valve 60 to the vaporizer 57. When propane fuel passes the vaporizer 57 and flows through the constant pressure valve 61 and conduit 58 into the carburetor, the ignition may then be turned on and the engine started. On account of the normally high vapor pressure of propane at atmospheric temperature conditions, it is merely necessary to push the push button 64 for a few seconds, during which short interval of time sufficient propane fuel will enter the carburetor for engine starting purposes. Then upon starting of the engine the oil pump 71 operates to furnish oil pressure to operate the pressure step-up system for furnishing the constant supply of fuel from the motor valve 59 for normal operation. This push button solenoid assembly may of course be operated from the vehicle's storage battery 65 which also is used for starting and lighting purposes.

At a point near the fuel tank 55 is a pressure relief valve 68 in the conduit 69. This pressure relief valve 68 is intended to be instrumental in preventing excessive pressures in the tank 55 during periods of operation. If the vehicle is being used in extremely hot weather, and along hot highways, for example, when the propane may be expected to exert high pressures in the tank 55, this relief valve 68 will open to permit flow of vaporous propane from the vapor space in the tank through the conduit 69 and on through the motor valve 59 for use as fuel. This gaseous propane removed from the tank in this manner may be in addition to or in place of liquid propane. When vaporous propane is thus removed, more liquid tends to evaporate and this evaporation cools the remaining liquid propane and accordingly reduces its vapor pressure. When this relieving of pressure by evaporation of propane has proceeded to such an extent that the vapor pressure of the remaining liquid propane is less than a desired pressure setting on the relief valve 68, gaseous propane will then not be passed by this valve. This valve will then remain closed until such time that the propane has become warmed again in the tank and the vapor pressure gas exceeds this relief valve setting. During normally cool weather conditions and in winter time liquid propane may be used at all times. For winter starting when pressures in the tank are less than the relief valve setting operation of the solenoid valve 62 will allow liquid propane to flow from the tank 55 through the by-pass line 69 and through the solenoid valve 62 for use as fuel. Then when the engine is started the solenoid valve 62 is permitted to close and the hydraulic pressure step-up operation operates the motor 59A to open the valve 59 and permit continued passage of liquid propane from the storage tank to the vaporizer.

A second pressure relief valve may be provided in communication with the vapor space of tank 55 for relief of pressure to the atmosphere in case the vehicle is stored and the engine is not operated under abnormally high temperature conditions. In such a case however, whenever the vehicle is not in use a tube should be provided for venting the pressure relieved propane to the exterior of any building in which the vehicle is stored. Reasons for this venting are obvious.

The propane fuel tank 55 should of course be constructed of sufficiently heavy gauge material to withstand any possible propane pressures and with a factor of safety. Since the vapor pressure of propane at 100° F. is about 190 pounds per square inch this tank should be able to withstand pressures of 400 or 500 pounds per square inch. In like manner all conduits in which propane under pressure is intended to flow should be constructed of sufficiently heavy material. The apparatus of the pressure step-up system should also be provided with sufficiently heavy material to withstand pressures necessary to operate the motor 59A.

In order to operate properly the motor 59A I make provisions so that the diaphragm 74 has a considerably greater surface area than the diaphragm 75 of Figure 1. This is necessary in order to step up the relatively low pressure from the right hand side of the diaphragm 74 to a considerably higher pressure on the left hand side of diaphragm 75. Thus if the diaphragm 74 has double the area of diaphragm 75 the pressure exerted on the motor 59A may be double that exerted by the oil pump 71 on the diaphragm 74. If a still higher pressure is required for operation of a motor 59A the ratio of diaphragm areas may be still larger than 2 to 1, for example 3 or 4 to 1.

Carburetors are available in commerce for use with automotive engines which utilize such fuels as propane. The carburetors desired to be used may be selected from among those commercially available.

The vaporizer 57 I have shown merely as a heat exchanger between the heat content of some of the cooling water of the cooling system and the propane to be vaporized. The cooling system is identified by reference numeral 84. The conduit 85 conducts hot water from the radiator to the vaporizer. Water is conducted then from the vaporizer 57 through conduit 86 back to the cooling system at some convenient point.

A mechanical linkage apparatus may be used for starting purposes, if desired.

For mechanically operating the priming device for starting the engine there is provided a mechanical foot-lever apparatus illustrated in Figure 4. A foot-lever 96, pivoted at pivot point 97, moves pivot lever 98 to pull a mechanical linkage 99 from left to right against the bias of a tension spring 100 to open valve 101, which corresponds to valve 62 of Figure 1.

While certain embodiments of the invention have been described for illustrative purposes, the invention is obviously not limited thereto.

I claim:

1. In a system for dispensing a highly volatile liquid fuel to a carburetor of an internal combustion engine, the improvement comprising, in combination, a liquid fuel storage tank, a carburetor in operative communication with the intake of said engine, a first conduit connecting the liquid containing space of said fuel tank with said carburetor, a hydraulically operable motor valve in said conduit, a fluid operative first diaphragm forming one wall of a first fluid-tight chamber, a second conduit for transmitting oil under pressure from the discharge side of the engine oil pump to the side of said diaphragm in said first fluid-tight chamber, a return oil line from said first chamber to the oil reservoir of said engine, an orifice in said return line to restrict oil flow therein, a second diaphragm forming one wall of a second fluid-tight chamber and operatively attached to said first diaphragm, a third conduit connecting said second chamber to the hydraulically operable motor of said motor valve, the surface area of said first diaphragm being greater than the surface area of said second diaphragm, and said motor of said valve, said third conduit and said second chamber being filled with a hydraulic fluid.

2. In a system for dispensing a highly volatile liquid fuel to a carburetor of an internal combustion engine, the improvement comprising, in combination, a liquid fuel storage tank, a carburetor in operative communication with the intake of said engine, a first conduit connecting the liquid containing space of said fuel tank with said carburetor, a hydraulically operable motor valve in said conduit adjacent said tank, a second conduit connecting the discharge of the engine lubricating oil pump to the oil reservoir of said engine, a first pressure responsive diaphragm in fluid communication with said second conduit, a second pressure responsive diaphragm of smaller surface area than the surface area of said first diaphragm, said second diaphragm being rigidly attached to said first diaphragm, said diaphragms being disposed operatively in a housing, a third conduit operatively connecting the housing of said second diaphragm with the hydraulically operable motor of said motor valve, said motor of said valve, said third conduit and the housing of said second diaphragm connected with said third conduit being filled operatively with a hydraulic fluid, an orifice in said second conduit between said oil reservoir and the point at which said first pressure responsive diaphragm communicates therewith to restrict oil flow from the pump to the reservoir and thereby maintain an oil pressure upstream of said orifice and against said first diaphragm greater than the oil pressure downstream of said orifice.

3. In a system for dispensing a liquefied petroleum gas fuel to a carburetor of an automotive engine, the improvement comprising, in combination, a liquid fuel storage tank, a carburetor in operative communication with the intake of an automotive engine, a first conduit connecting the liquid containing space of said fuel tank with said carburetor, a hydraulically operable motor valve in said conduit adjacent said tank, a second conduit leading from the discharge of the automotive lubricating oil pump to a first pressure responsive diaphragm, a return oil conduit leading from said second conduit to the oil reservoir of said engine, an orifice in said return oil conduit, a second pressure responsive diaphragm of smaller surface area than the surface area of said first diaphragm, said second diaphragm being rigidly attached to said first diaphragm, said diaphragms being disposed operatively in housings, a third conduit connecting the housing of said second diaphragm on the side thereof opposite said first diaphragm with the hydraulically operable motor of said motor valve, said motor of said valve, said third conduit and the housing of said second diaphragm connected to said third conduit being filled operatively with a hydraulic fluid, a fourth conduit connecting the vapor space of said fuel tank with said first conduit at a point intermediate said motor valve and said carburetor, a pressure relief valve in said fourth conduit, a second and normally closed valve in said fourth conduit between said pressure relief valve and the point said fourth conduit connects with said first conduit, means to open said normally closed valve and a fifth conduit connecting said fourth conduit at a point between said pressure relief valve and said normally closed motor valve with said first conduit at a point between the first mentioned motor valve and said fuel tank.

4. The dispensing system of claim 3, wherein said second and normally closed valve is a solenoid valve, and a push button means to open this solenoid valve.

5. The dispensing system of claim 3 wherein said means to open said normally closed valve is a foot-lever assembly.

6. In a system for dispensing a highly volatile liquid fuel to a carburetor of an automotive engine, the improvement comprising, in combination, a liquid fuel storage tank, a carburetor in operative communication with the intake of said automotive engine, a first conduit connecting the liquid containing space of said fuel tank with said carburetor, a hydraulically operable motor valve in said conduit adjacent said tank, a second conduit leading from the discharge of the automotive lubricating oil pump to a first pressure responsive diaphragm, a return oil conduit leading from said second conduit to the oil reservoir of said engine, an orifice in said return oil conduit, a second pressure responsive diaphragm of smaller surface area than the surface area of said first diaphragm, said second diaphragm being rigidly attached to said first diaphragm, said diaphragms being disposed operatively in housings, a third conduit connecting the housing of said second diaphragm on the side thereof opposite said first diaphragm with the hydraulically operable motor of said motor valve, said motor of said valve, said third conduit and the housing of said second diaphragm connected to said third conduit being filled operatively with a hydraulic fluid, a fourth conduit connecting the vapor space of said fuel tank with said first conduit at a point between said motor valve and said fuel tank, a pressure relief valve in said fourth conduit, a fifth conduit leading from said engine oil reservoir to said second conduit at a point between said orifice and said oil pump, a positive displacement manually operable pump in said fifth conduit adapted to pump oil from said reservoir to said second conduit.

CHARLES MacSPORRAN.

REFERENCES CITED

The following references are of record in the file of this patent:

UNITED STATES PATENTS

| Number | Name | Date |
| --- | --- | --- |
| 2,475,086 | Ensign | July 5, 1949 |